(12) United States Patent
Phillips

(10) Patent No.: US 7,331,166 B2
(45) Date of Patent: Feb. 19, 2008

(54) COUPLING MECHANISM FOR MOWER CUTTING UNITS

(75) Inventor: David Lawrence Phillips, Willow Springs, NC (US)

(73) Assignee: Deere & Company, Moline, IL (US)

( * ) Notice: Subject to any disclaimer, the term of this patent is extended or adjusted under 35 U.S.C. 154(b) by 289 days.

(21) Appl. No.: 11/046,309

(22) Filed: Jan. 28, 2005

(65) Prior Publication Data

US 2006/0168929 A1    Aug. 3, 2006

(51) Int. Cl.
*A01D 75/30* (2006.01)

(52) U.S. Cl. .................. 56/7; 56/249; 56/294

(58) Field of Classification Search ............. 56/6, 56/7, 14.7, 156, 198–200, 228, 249, DIG. 20, 56/13.5, 13.6, 15.1–15.3, 15.6–15.8, 252, 56/294
See application file for complete search history.

(56) References Cited

U.S. PATENT DOCUMENTS

| 3,408,801 | A | * | 11/1968 | Kroll ............................ 56/199 |
| 3,824,772 | A | | 7/1974 | Sorenson et al. ................ 56/7 |
| 4,644,737 | A | * | 2/1987 | Arnold ......................... 56/249 |
| 4,750,319 | A | * | 6/1988 | Aldred ............................ 56/7 |
| 4,769,976 | A | | 9/1988 | Bassett et al. .................... 56/7 |
| 4,777,786 | A | * | 10/1988 | Arnold ......................... 56/199 |
| 5,293,729 | A | | 3/1994 | Curry et al. ..................... 56/7 |
| 5,297,378 | A | | 3/1994 | Smith ............................. 56/7 |
| 5,343,680 | A | | 9/1994 | Reichen et al. .............. 56/249 |
| RE34,921 | E | | 5/1995 | Lamusgo et al. ................ 56/7 |
| 5,459,984 | A | | 10/1995 | Reichen et al. .................. 56/7 |
| 5,533,326 | A | * | 7/1996 | Goman et al. .................... 56/7 |
| 5,623,817 | A | | 4/1997 | Bricko et al. .................... 56/7 |
| 5,865,016 | A | | 2/1999 | Toman ............................ 56/7 |
| 5,970,690 | A | | 10/1999 | Toman ............................ 56/7 |
| 6,237,313 | B1 | | 5/2001 | Leden ......................... 56/199 |
| 6,341,478 | B1 | | 1/2002 | Sallstrom et al. ................ 56/7 |
| 6,347,671 | B1 | | 2/2002 | Stiller et al. ................ 172/439 |
| 2002/0157367 | A1 | | 10/2002 | Oliver ............................. 56/7 |
| 2005/0229567 | A1 | * | 10/2005 | Phillips .......................... 56/7 |

* cited by examiner

*Primary Examiner*—Thomas B. Will
*Assistant Examiner*—Alicia Torres

(57) ABSTRACT

A coupling mechanism for a reel-type mower cutting unit holds the cutting unit in a mowing position, a partially raised service position, or a fully raised transport position. The coupling mechanism is positioned to avoid blocking the discharge of grass into a grass catcher mounted directly in front of the cutting unit. Each reel-type cutting unit is positioned so that the reel axis is a maximum of 28 inches from the front wheel axis of the mowing machine when the cutting unit is in the mowing position.

18 Claims, 6 Drawing Sheets

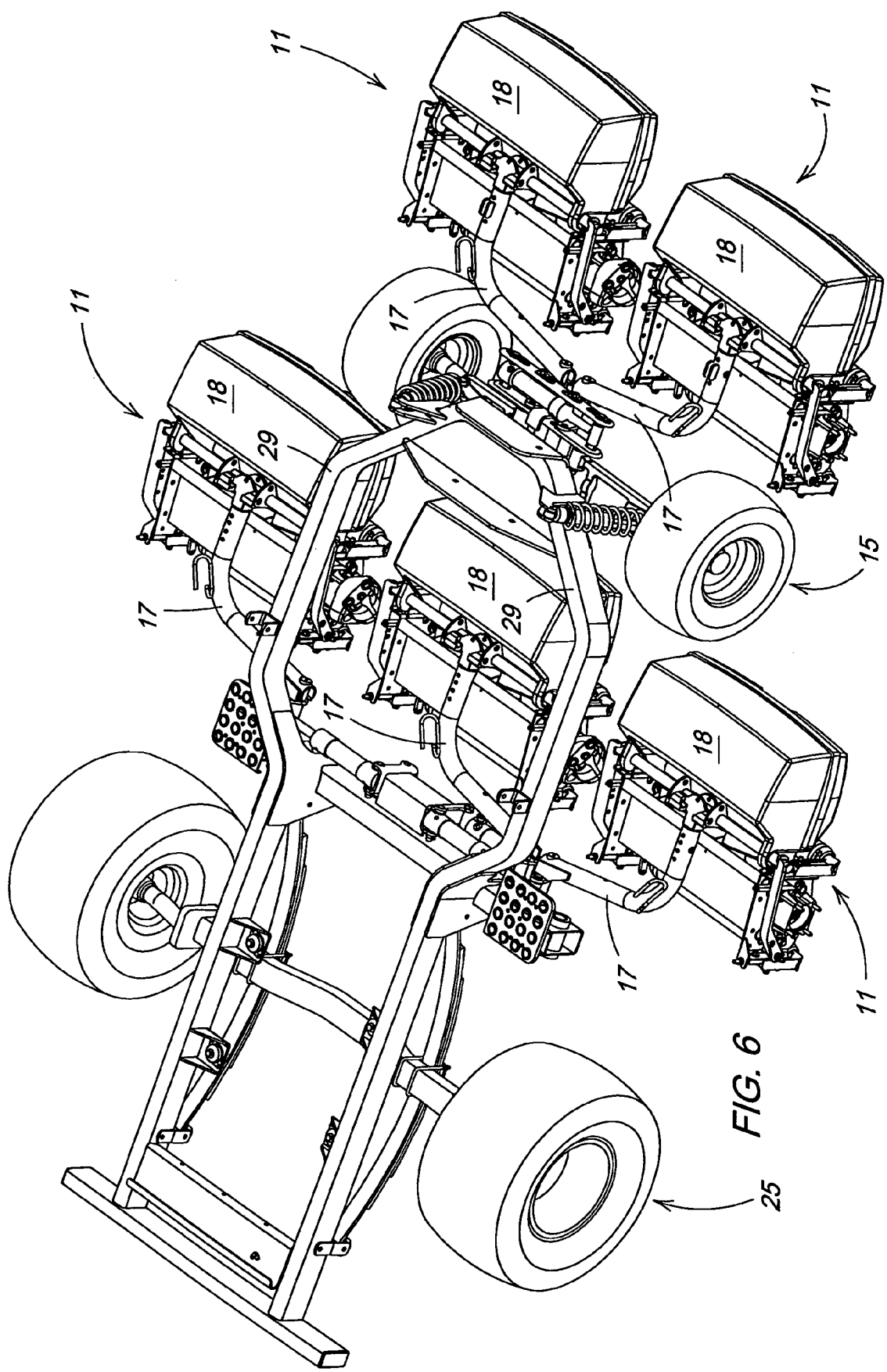

COUPLING MECHANISM FOR MOWER CUTTING UNITS

FIELD OF THE INVENTION

This invention relates to mowing machines for cutting grass on golf course fairways and, more specifically, to coupling mechanisms used to attach and suspend cutting units from mowing machines.

BACKGROUND OF THE INVENTION

Mowing machines for golf course fairways, athletic fields and similar applications require high precision cutting. The machines may include a vehicle frame supported by front and rear wheels, an operator station, and three, five or more cutting units. Each cutting unit may cut blades of grass between a reel rotating on a shaft with a horizontal axis, and a bed knife. Each cutting unit may be supported by a lift arm extending from the vehicle frame, and a coupling mechanism attaching the cutting unit to the lift arm.

Coupling mechanisms must allow the cutting unit to traverse and cut grass on humps, slopes and other irregular surfaces without damaging the surfaces. To accommodate ground surface variations, the lift arm supporting the cutting unit may apply a downforce to the cutting unit, and the coupling mechanism may allow the cutting unit to pivot sufficiently on a horizontal axis so that the cutting unit may pivot or float over the grass surface.

Additionally, coupling mechanisms should allow cutting units to pivot or steer on a vertical axis when the vehicle turns. This helps minimize the tendency of the cutting unit to drag, scuff, or otherwise damage the turf during mowing.

Coupling mechanisms also may allow cutting units to be raised using the lift arm to a transport position when driving the vehicle between different locations and/or on paved roads. Additionally, some coupling mechanisms allow raising cutting units with the lift arm to a service or maintenance position, in which reel to bed knife clearance and height of cut may be properly adjusted, and other maintenance operations also may be performed.

U.S. Pat. Nos. 5,293,729, 5,297,378, 5,343,680 and 5,459,984 assigned to Deere & Company, and U.S. Pat. No. Re. 34,921 assigned to The Toro Company, provide examples of mowing machines for golf course fairways with coupling mechanisms.

Existing coupling mechanisms for reel-type mowers on mowing machines for golf course fairways and similar applications are relatively expensive and complex, and contribute to the cost and assembly time of the mowing machine. There is a need for a lower cost, simplified coupling mechanism for attaching cutting units to mowing machines used on golf course fairways, athletic fields and similar applications.

Existing coupling mechanisms also tend to partially block the path of grass discharged from the cutting unit into a grass catcher. If the coupling mechanism disrupts flow of clippings into the grass catcher, it may cause uneven filling and blockage at the catcher opening. A coupling mechanism is needed to reduce or minimize blockage of grass discharge from a cutting unit into a grass catcher.

SUMMARY OF THE INVENTION

An improved, lower cost coupling mechanism holds a cutting unit to a mowing machine for golf course fairways and similar applications. The coupling mechanism may be removably attached to the forward bar of a cutting unit. The coupling mechanism may include a pair of laterally spaced plates and a pair of removable pins positioned above the forward bar, so that the grass discharge zone is not blocked.

The improved, lower cost coupling mechanism is connected to the end of a lift arm that can partially raise the cutting unit to a service or maintenance position, and fully raise the cutting unit to a transport position. Each cutting unit may be positioned so that each reel axis is within 28 inches of the front wheel axis of the mower, and the cutting unit pivots on a horizontal axis, not a vertical axis.

BRIEF DESCRIPTION OF THE DRAWINGS

FIG. 6 is a top perspective view of a mowing machine frame with cutting units attached thereto using coupling mechanisms according to a first embodiment.

DESCRIPTION OF A PREFERRED EMBODIMENT

Figure 1:
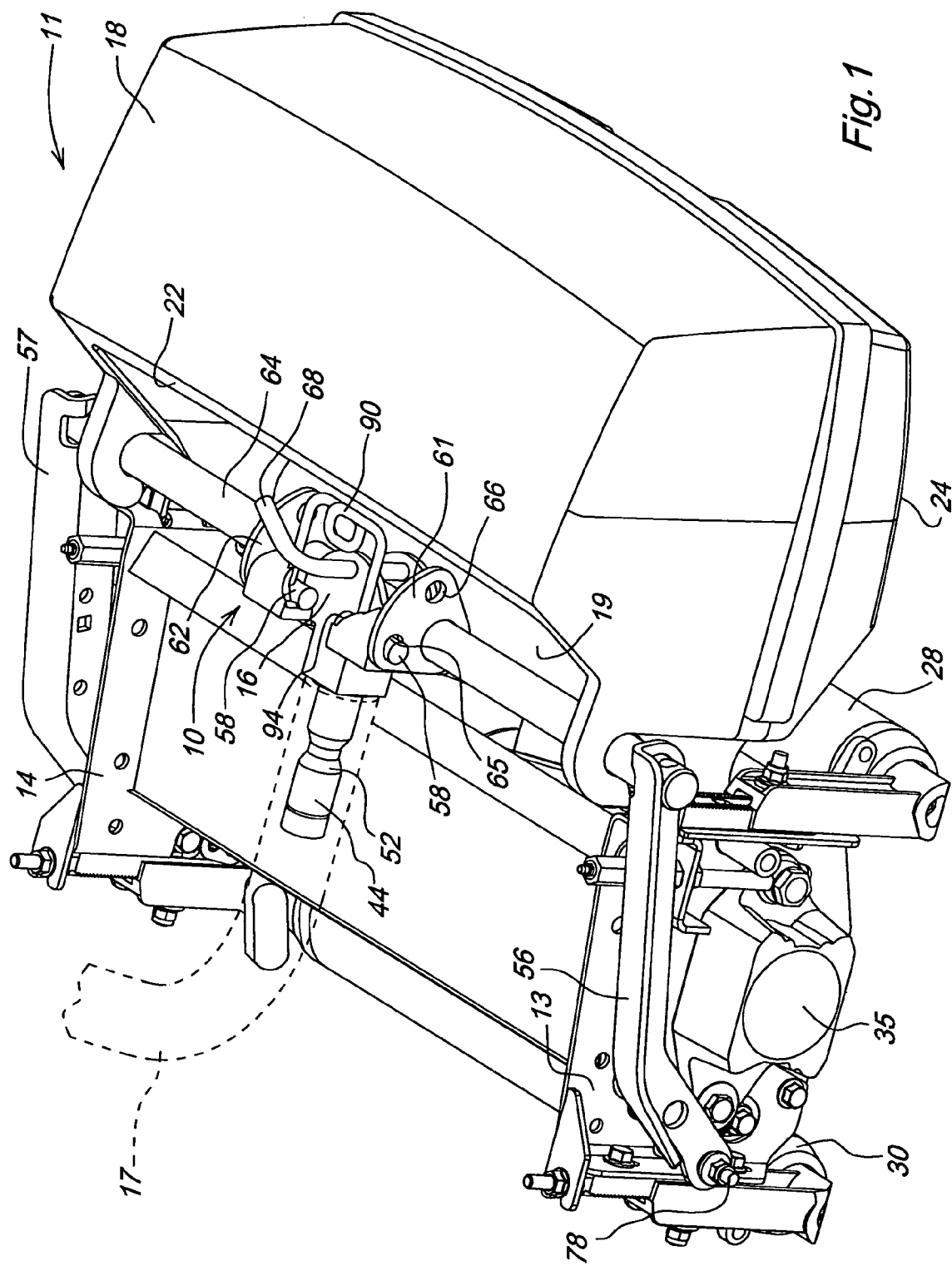
FIG. 1 is a top right perspective view of a cutting unit and coupling mechanism according to a first embodiment of the present invention.

In one embodiment of the invention shown in FIGS. 1-6, coupling mechanism 10 may be used to attach cutting unit 11 to a lift arm 17 extending laterally from a mowing machine. The mowing machine may be generally adapted to cut grass on golf course fairways, athletic fields, or similar applications where high quality cutting is desired. The mowing machine may have a pair of front wheels 15 and a pair of rear wheels 25. In one embodiment, the rear wheels may be steered and the front wheels may not be steered. However, in other embodiments, the front wheels may be steered. Three, five or more cutting units are positioned side-by-side in two rows immediately in front of or behind the pair of front wheels.

In one embodiment, coupling mechanism 10 may connect cutting unit 11 to arm 17 which extends laterally from a mowing vehicle frame 29. Lift arm 17 may be a hollow L-shaped tube having a first end pivotably connected by bushings 34 to frame member 29, and a second end extending laterally from the frame when it is in the mowing position. The lift arm also may extend forwardly from the frame. Hydraulic cylinder 40 may be engaged to lift arm 17 to selectively pivot the lift arm to raise and lower the cutting unit. The hydraulic cylinder also may be adapted to apply a downforce to the lift arm for pressing the cutting unit against the ground during mowing.

In one embodiment, cutting unit 11 may include a generally cylindrical cutting reel rotatably supported between opposing side frames 13, 14. The reel may have spiral blades rotating on a reel shaft with a horizontal axis. The reel may have a width between about 18 inches and about 30 inches, and a diameter between about 4 inches and about 10 inches.

The reel may be driven by an electric or hydraulic motor 35 mounted on the end of the reel, or by a belt or chain drive engaged to a motor. The cutting unit may include ground engaging front and rear support rollers 28, 30 which may help support the cutting unit at a proper height above the ground during mowing operations. The cutting reel's horizontal axis may be positioned less than about 28 inches from the horizontal axis of the pair of front wheels 15.

In one embodiment, grass catcher 18 may be carried by cutting unit 11 directly in front of the cutting unit. For example, the grass catcher may be hooked to forward bar 64 which extends laterally across the front of the cutting unit and/or other front facing components of the cutting unit, and may be removable from the cutting unit to empty the clippings. The grass catcher may be a plastic enclosure having a width approximately the same as the cutting reel, and a single rear-facing opening 19 through which the grass clippings enter. The rear-facing opening may be generally oblong or rectangular. The opening may have an upper lip or edge 22 and a lower lip or edge. The lower lip or edge may be above the bottom surface 24 of the grass catcher so that grass clippings may be retained inside the grass catcher while mowing. In other words, the bottom surface may be lower than the lower lip or edge of the opening, so that grass clippings are easily retained in the grass catcher after entering through the opening.

In one embodiment, coupling mechanism 10 may have a body 16 with a generally horizontal shaft 44 that extends rearwardly from the body. The horizontal shaft may be received within the end portion of lift arm 17. The horizontal shaft may have a double conical opening 52. A pin or internal projection in lift arm 17 may help engage and retain the horizontal shaft, and allow the horizontal shaft to pivot on a generally horizontal axis through a limited range of motion. The horizontal axis may be defined by the end portion of lift arm 17.

In one embodiment, the coupling mechanism may be engaged to forward bar 64 that extends laterally across the forward end of cutting unit 11 near the rear facing opening of the grass catcher. Forward bar 64 may be connected at its opposing ends to left and right yoke arms 56, 57. The yoke arms may be attached to side frames 13, 14 of the cutting unit. For example, yoke arms 56, 57 may be connected to the side frames of a cutting unit at connection points 78. The connection points may be located between rollers 28 and 30 but closer to rear roller 30 than front roller 28, and may be behind the cutting unit's center of gravity. The front bar, along with the left and right yoke arms, form a yoke assembly secured to the cutting unit.

In one embodiment, one or more removable pins 58, 68 may be used to engage or disengage the coupling mechanism body 16 from forward bar 64. Each pin 58 may be aligned horizontally and each pin 68 may be aligned vertically when engaged to the coupling mechanism body. In the engaged position, the pins are completely or primarily positioned above forward bar 64. The coupling mechanism including the removable pins may hold and lock the cutting unit in a mowing position, a service position, or a transport position. For example, to hold the cutting unit in the mowing position of FIG. 2, horizontal pins 58 may be positioned in first openings 65 defined in a pair of laterally spaced plates 61, 62 which may be fixed as by welds to front bar 64.

Figure 3:
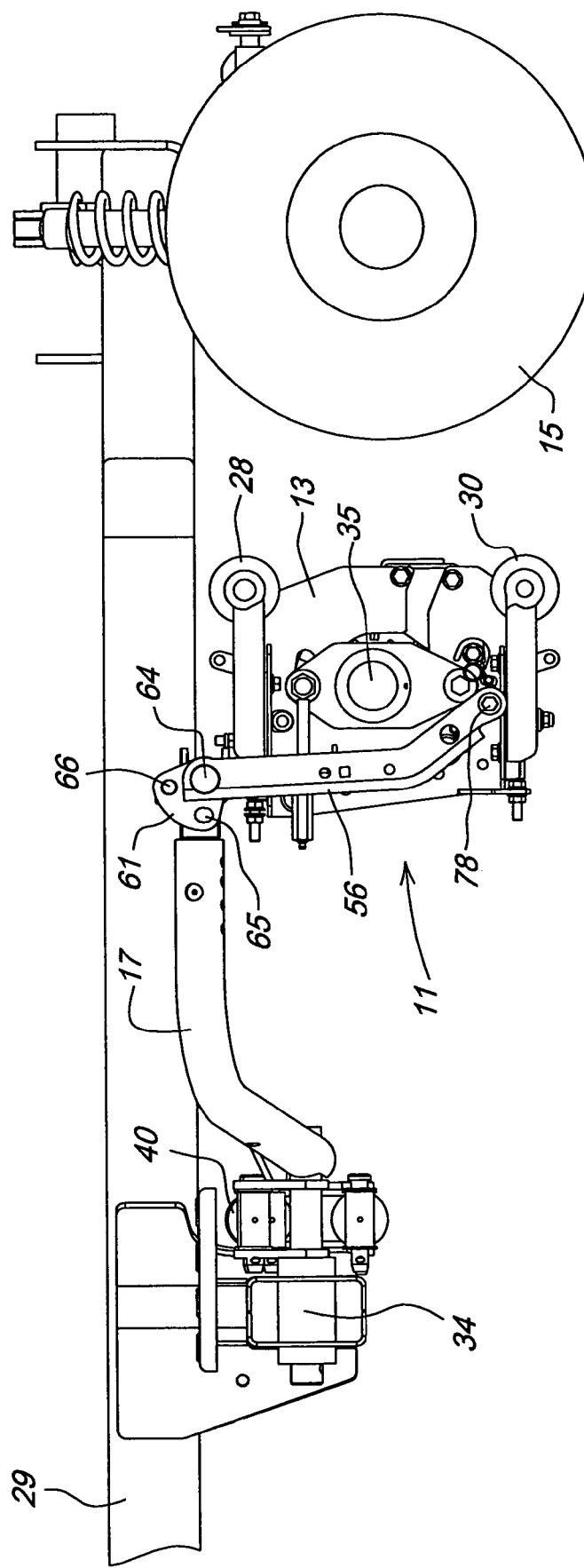
FIG. 3 is a side view of a cutting unit attached to a mowing machine in the service or maintenance position with a first embodiment of the coupling mechanism.

In one embodiment, a cutting unit may be moved from the mowing position to the partially raised service or maintenance position of FIG. 3. First or horizontal pins 58 may be removed from first openings 65, and arm 17 may be pivoted using hydraulic cylinder 40, preferably between about three inches and about 12 inches. For example, horizontal pins 58 may be shifted inwardly by pivoting lever 90. As lever 90 pivots, end portions of the lever may engage ramp or cam surface 94 in coupling body 16, and the end portions are pressed or shifted inwardly toward each other. As a result, horizontal pins 58 shift inwardly with the end portions of lever 90, and become removed from first openings 65 in laterally spaced plates 61, 62.

In one embodiment, as lift arm 17 is pivoted to partially raise the cutting unit to the service position (after pins 58 are removed from openings 65), the cutting unit also may be allowed to pivot downwardly with respect to the coupling mechanism. In this position, the underside of the cutting unit is exposed forwardly for service. Horizontal pins 58 may be used to hold the cutting unit in the partially raised service or maintenance position by aligning the pins for insertion in second openings 66 in the pair of laterally spaced plates 61, 62. With horizontal pins 58 inserted in second openings 66, the cutting unit may be held against pivotal motion so that adjustments or maintenance may be done to the exposed underside of the cutting unit.

In one embodiment, the cutting unit may be partially raised and placed in the service position by use of the hydraulic cylinder. Lever 90 may be shifted past ramped portion 94 and onto a flatted portion where the lever may remain generally stationary. Horizontal pins 58 may be disengaged from first openings 65, and the cutting unit may be allowed to pivot downwardly when lift arm 17 raises the cutting unit for service. In the partially raised service position, the lift arm raises or lifts the cutting unit off the ground, but the lift arm may continue to extend laterally from the mowing machine. After the cutting unit is partially raised to the service position, the operator may pivot lever 90 to press or bias horizontal pins 58 outwardly against plates 61, 62. The operator may need to manually pivot the cutting unit forwardly slightly with respect to plates 61, 62 in order to align horizontal pins 58 with second openings 66. Horizontal pins 58 may be biased outwardly and will spring outwardly into second openings 66 when proper alignment is achieved. The biasing action of lever 90 eliminates the need for the operator to manually reinsert the horizontal pins at the same time he is pivoting the cutting unit to the proper alignment. In the service or maintenance position, the underside of the cutting unit may be accessible for adjustment of reel to bed knife clearance, cutting height, and other adjustments or repairs.

Figure 2:
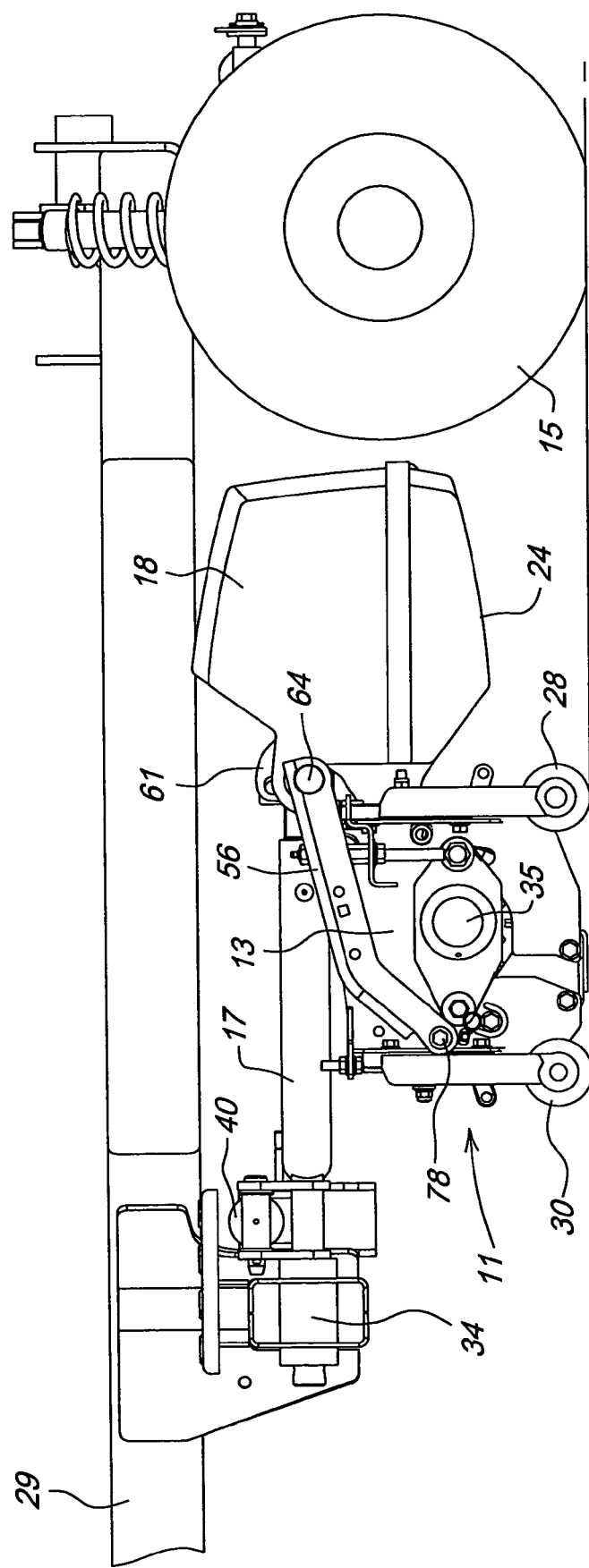
FIG. 2 is a side view of a cutting unit attached to a mowing machine in the mowing position with a first embodiment of the coupling mechanism.

In one embodiment, when the cutting unit is to be returned to the mowing position of FIG. 2, lever 90 may be pivoted sufficiently to disengage the horizontal pins 58 from second openings 66 in the laterally spaced plates. The cutting unit's center of gravity 80 may pivot rearwardly to a position generally beneath front bar 64. As lift arm 17 is pivoted downwardly using hydraulic cylinder 40, the cutting unit may pivot rearwardly to its mowing position when the ground is contacted. Once the cutting unit is lowered into proper alignment on the ground, the operator may shift lever 90 to bias the horizontal pins 58 outwardly so that they engage first openings 65 in plates 61, 62.

Figure 4:
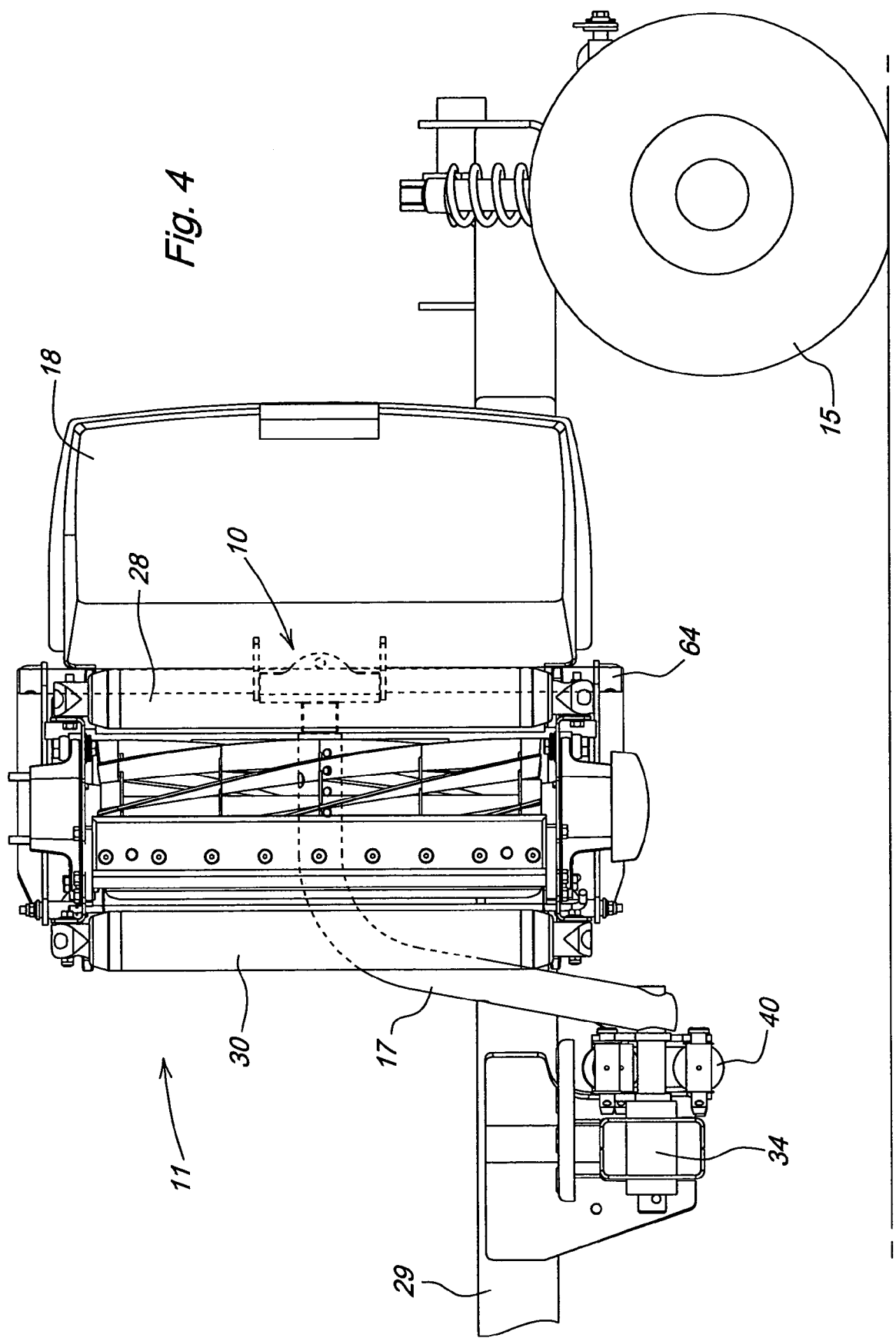
FIG. 4 is a side view of a cutting unit attached to a mowing machine in the fully raised or transport position with a first embodiment of the coupling mechanism.
Figure 5:
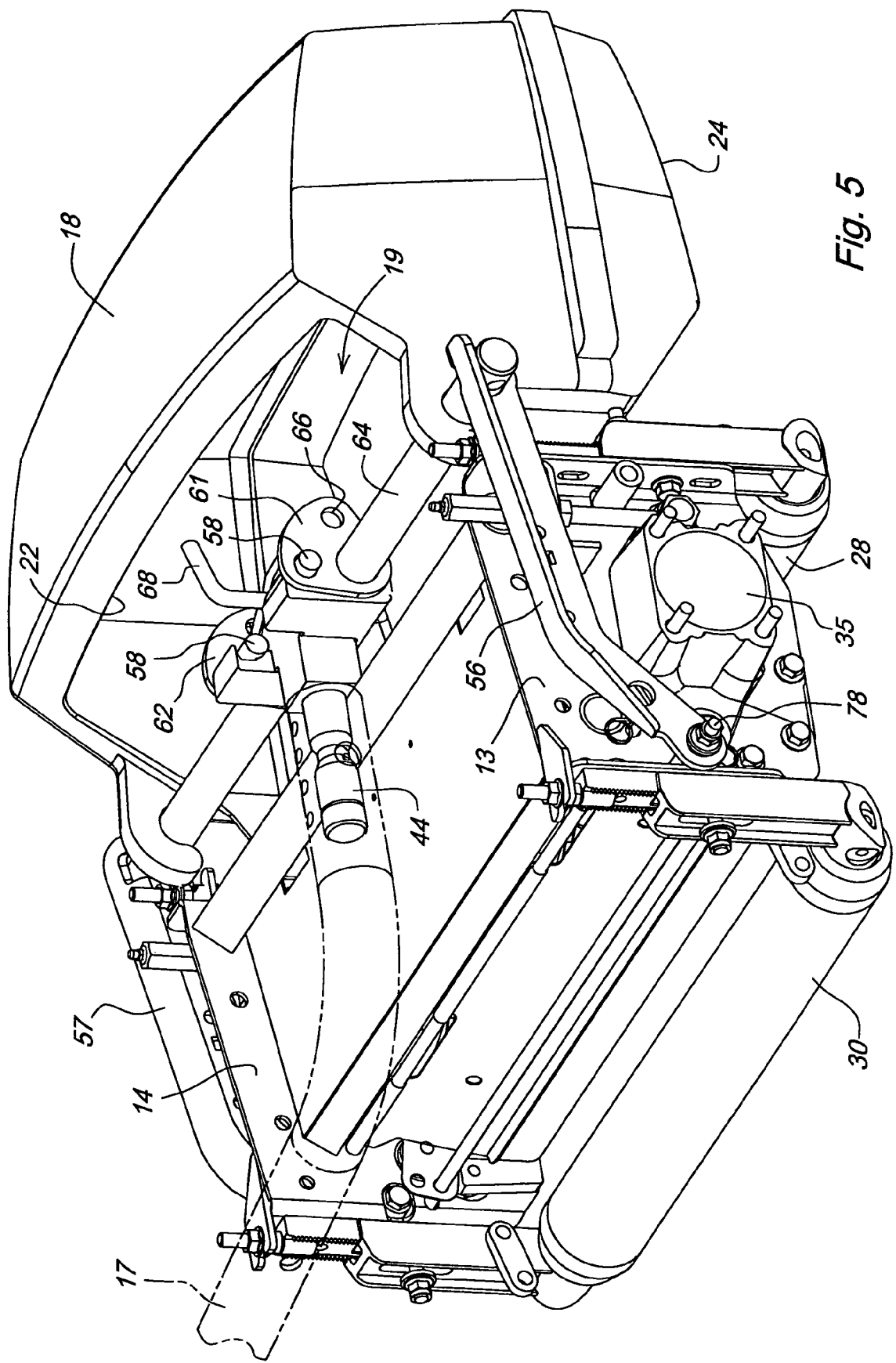
FIG. 5 is a right side perspective view of a cutting unit and coupling mechanism according to a first embodiment of the present invention.

In one embodiment, as shown in FIG. 4, a cutting unit may be moved to a fully raised or transport position by fully or completely pivoting lift arm 17 to an upright position. In the fully raised or transport position, the lift arm does not extend laterally from the mowing machine, but has pivoted to an upright position from the mowing machine and may have a nearly or partially vertical orientation. When a cutting unit is in the fully raised or transport position, horizontal pins 58 may remain in openings 65. As a result, when the cutting unit reaches the transport position, the reel in the cutting unit may have a generally vertical alignment. In the transport position, the cutting units may be lifted so that they are within the track width of the mowing machine. For example, the cutting units on the left and right of the second row, may be raised to a transport position that is within the track width of rear wheels 25. Similarly, the cutting units on the first row may be raised to a transport position within the track width of front wheels 15.

In one embodiment, a second or vertical pin 68 may confine forward bar 64 within a groove defined in the body portion 16 of the coupling mechanism. The vertical pin may be removed to allow the cutting unit to be removed from the coupling mechanism.

In one embodiment, while the cutting unit is in the mowing position, the plates 61, 62 and removable pins 58, 68 are positioned in a plane above forward bar 64, and not below forward bar 64. As a result, the coupling mechanism will not block any part of the discharge zone between the cutting unit and the grass catcher, or will minimize the blockage. For example, in the mowing position, laterally spaced plates 61, 62 extend upwardly from forward bar 64. In the mowing position, openings 65, 66 may be positioned above the centerline of forward bar 64, and coupling mechanism body 16 also may be positioned above forward bar 64.

In one embodiment, the present invention significantly reduces the coupling mechanism cost and complexity. It has been found that a cutting unit with a reel axis positioned within about 18 inches of the outer tire surface of the front pair of wheels, or within about 28 inches from the horizontal centerline of the front pair of non-steerable wheels, will not skid or tear the turf when the mowing machine turns. As a result, the coupling mechanism may be simplified and reduced in cost, and the improved coupling mechanism may be positioned so that it does not block the grass discharge zone to the grass catcher. Thus, in one embodiment, coupling mechanism 11 may be positioned above the forward bar such that it does not block the discharge stream from the cutting unit to the grass catcher.

Having described the preferred embodiment, it will become apparent that various modifications can be made without departing from the scope of the invention as defined in the accompanying claims.

The invention claimed is:

1. An apparatus comprising:
 a mowing machine having a front pair of wheels on a front wheel axis and track width and a rear pair of wheels having a rear wheel axis and track width;
 a plurality of cutting units positioned in front of and behind the front pair of wheels; each cutting unit discharging grass frontwardly and having a forward bar extending laterally across the front of the cutting unit and a grass catcher removably attached to the front of the cutting unit, the grass catcher having a rear-facing opening toward the cutting unit for receiving grass discharged from the cutting unit;
 a lift arm hinged to the mowing machine, the lift arm pivotable between a laterally extended position, a partially raised position, and a fully raised position; and
 a coupling mechanism removably connecting the forward bar of the cutting unit to the lift arm, including a pair of laterally spaced plates and a pair of removable pins that hold the cutting unit in a mowing position, a service position, or a transport position, the laterally spaced plates and removable pins positioned above the forward bar and out of the grass discharge path in the mowing position.

2. The apparatus of claim 1 wherein the plurality of cutting units are cutting reels having generally horizontal axes.

3. The apparatus of claim 1 wherein the horizontal axis of each cutting unit is positioned within 28 inches of the front wheel axis.

4. The apparatus of claim 1 wherein the grass catcher is hooked to the forward bar.

5. The apparatus of claim 1 wherein the cutting unit is attached to an end of the arm for pivoting on a horizontal axis defined by the end of the arm.

6. A coupling mechanism to attach a reel mower cutting unit to a mowing machine, the reel mower cutting unit discharging grass frontwardly, comprising:
 a forward bar extending laterally across the front of the reel mower cutting unit; the forward bar having a pair of plates extending upwardly therefrom; each plate having a first opening and a second opening above the forward bar;
 a coupling body having a rearwardly extending shaft engageable with a lift arm extending laterally from the mowing machine; the rearwardly extending shaft pivoting on a generally horizontal axis defined by the lift arm; and
 at least one horizontal pin engageable with the coupling body and the first openings in the plates whereby the plates and horizontal pin are above the forward bar to hold the reel mower cutting unit in a mowing position without obstructing grass discharge from the reel mower cutting unit, the horizontal pin engageable with the coupling body and the second openings in the plates to hold the reel mower cutting unit in a partially raised service position.

7. The coupling mechanism of claim 6 further comprising a vertical pin engageable with a groove in the coupling body to hold the coupling body to the forward bar of the reel mower cutting unit, and disengageable to detach the coupling body from the forward bar of the reel mower cutting unit.

8. The coupling mechanism of claim 6 further comprising a lever to selectively engage the horizontal pin with the first openings or the second openings.

9. The coupling mechanism of claim 6 further comprising a hydraulic cylinder to apply a downforce to the lift arm when the reel mower cutting unit is in the mowing position.

10. The coupling mechanism of claim 6 further comprising a hydraulic cylinder to pivot the lift arm upwardly to move the reel mower cutting unit to the partially raised service position, and also to pivot the lift arm further upwardly to move the reel mower cutting unit to the fully raised transport position.

11. The coupling mechanism of claim 6 further comprising a grass catcher removably mounted to the front of the reel mower cutting unit, the grass catcher having a generally oblong rear-facing opening with an upper lip or edge, a lower lip or edge, and bottom surface below the lower lip or edge.

12. An apparatus comprising:
 a mowing machine having a frame with a pair of front wheels mounted thereto defining a front wheel axis, and a plurality of lift arms extending laterally from the frame, each lift arm having a coupling mechanism attached to one end thereof;
 a plurality of reel cutting units removably connected to the lift arms with the coupling mechanisms, each reel cutting unit having a bar extending laterally across the front of the cutting unit in front of and above a reel rotating on a horizontal axis and a removable grass catcher with an opening to receive and hold grass clippings discharged from the reel cutting unit; and the coupling mechanisms selectively holding the reel cutting units in a mowing position, a partially raised service position, or a fully raised transport position, each coupling mechanism extending above the bar without obstructing the discharge of grass clippings from the reel cutting unit into the grass catcher in the mowing position, the reel axis of each reel cutting unit being a maximum of 28 inches from the front wheel axis in the mowing position.

13. The apparatus of claim 12 wherein each coupling mechanism is removably connected to the bar.

14. The apparatus of claim 12 wherein each coupling mechanism includes a first horizontal pin and a second vertical pin, each pin being engageable or disengageable from an opening or groove in the coupling mechanism to move the reel cutting unit.

15. The apparatus of claim 14 further comprising a pair of plates attached to the forward bar, each plate having a first opening engaging the first horizontal pin to hold the reel cutting unit in the mowing position or the transport position, and a second opening engaging the first horizontal pin to hold the reel cutting unit in the service position.

16. The apparatus of claim 12 further comprising a pair of rear wheels mounted to the frame to define a rear wheel track, the reel cutting units being within the rear wheel track in the transport position.

17. The apparatus of claim 12 further comprising a hydraulic cylinder connected to each lift arm to selectively raise and lower the lift arm.

18. The apparatus of claim 12 wherein the grass catcher has a bottom surface and an oblong opening having a lower edge above the bottom surface.

* * * * *